Feb. 7, 1939.   E. A. SHARD ET AL   2,146,449
TICKET ISSUING MACHINE
Filed Oct. 18, 1937   6 Sheets-Sheet 1

INVENTORS
Elmer A. Shard
Henry G. Weiss
BY
Murra Sackhoff Zugelter & Paddack
ATTORNEYS.

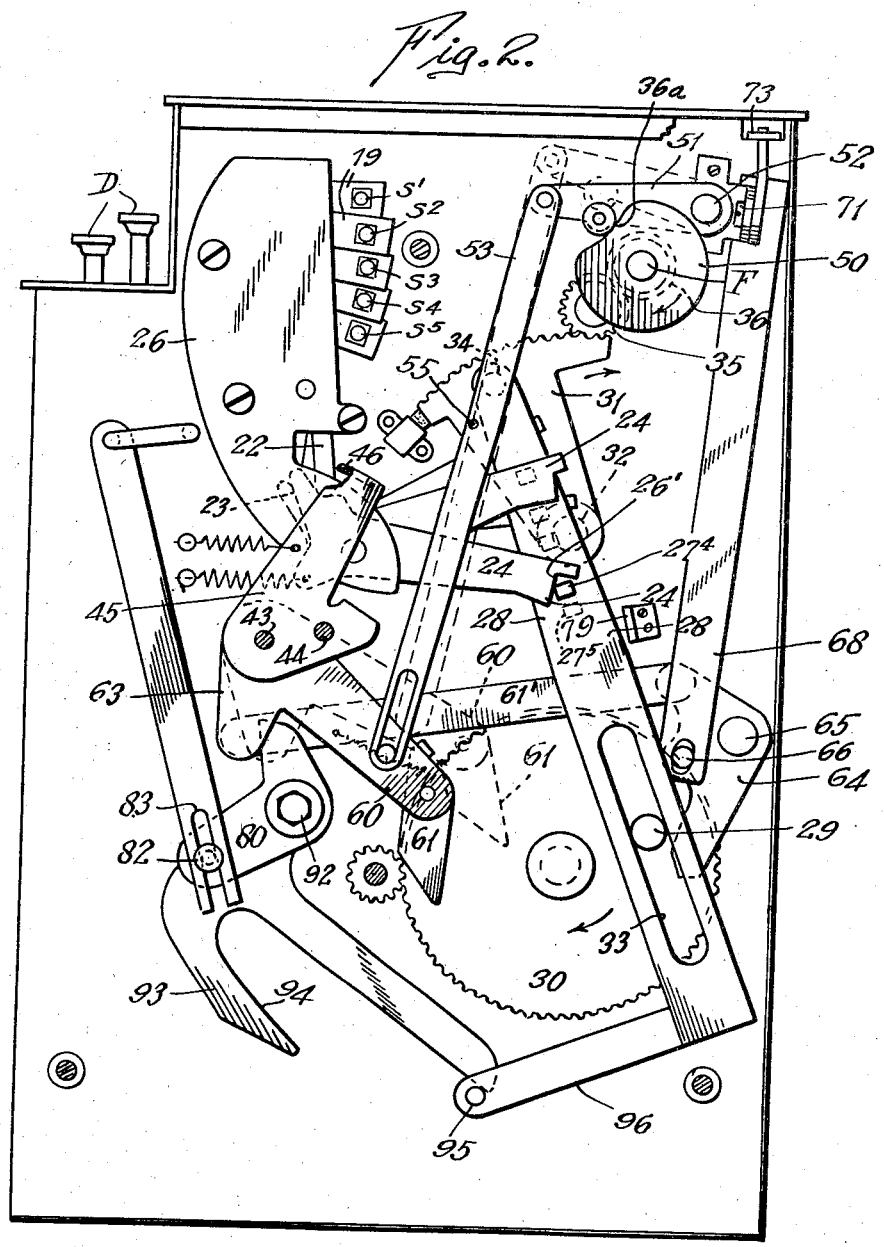

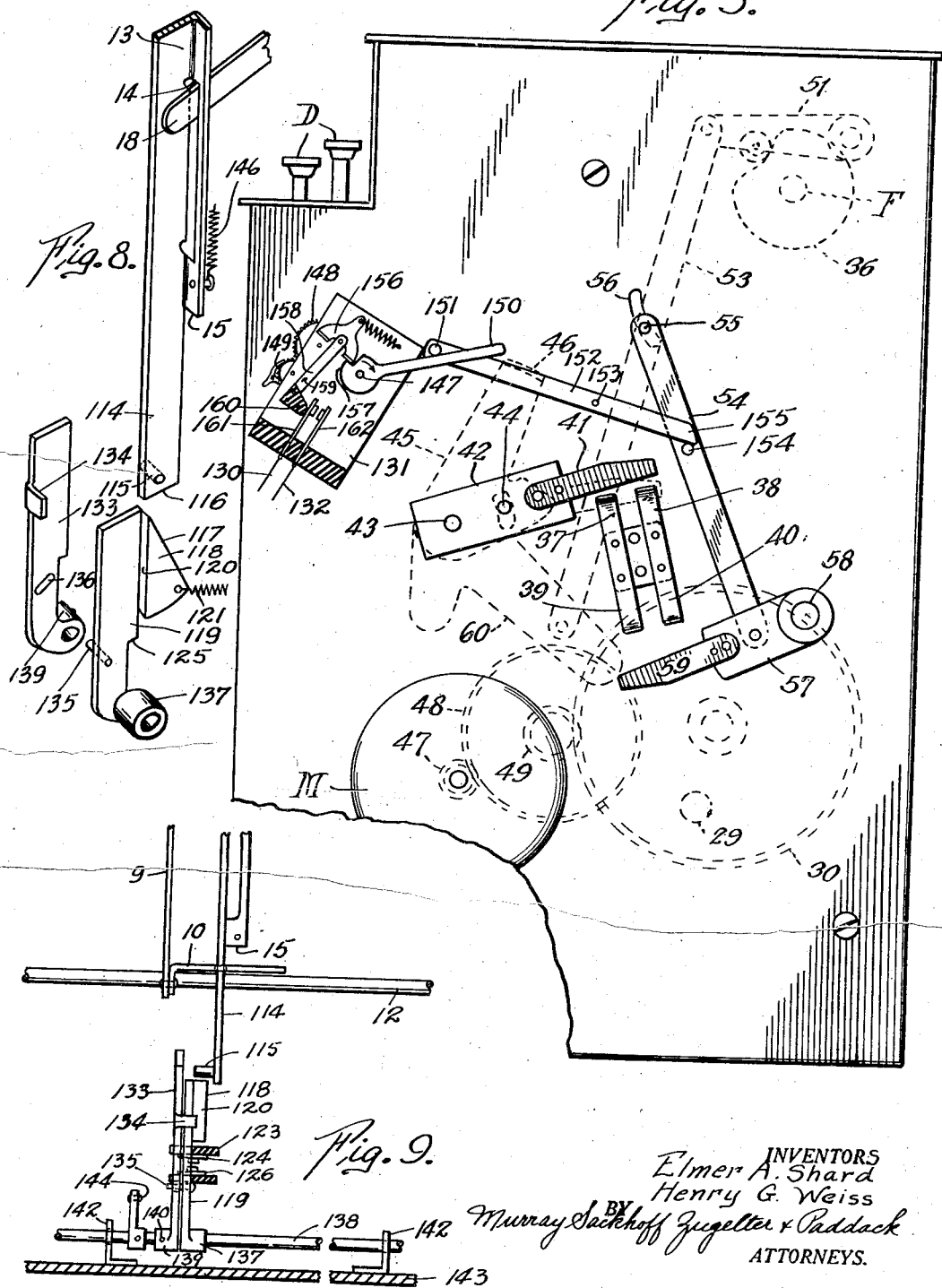

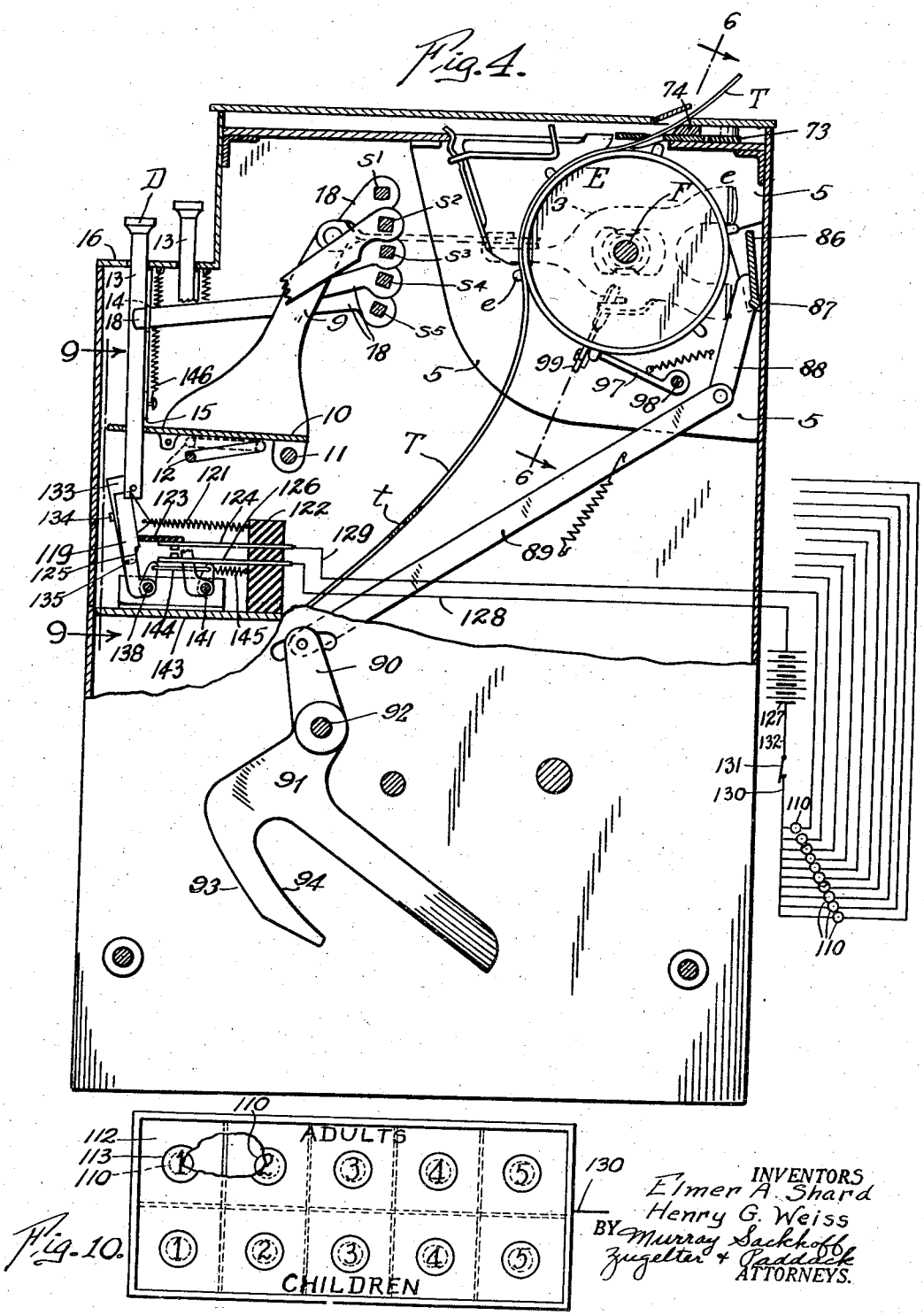

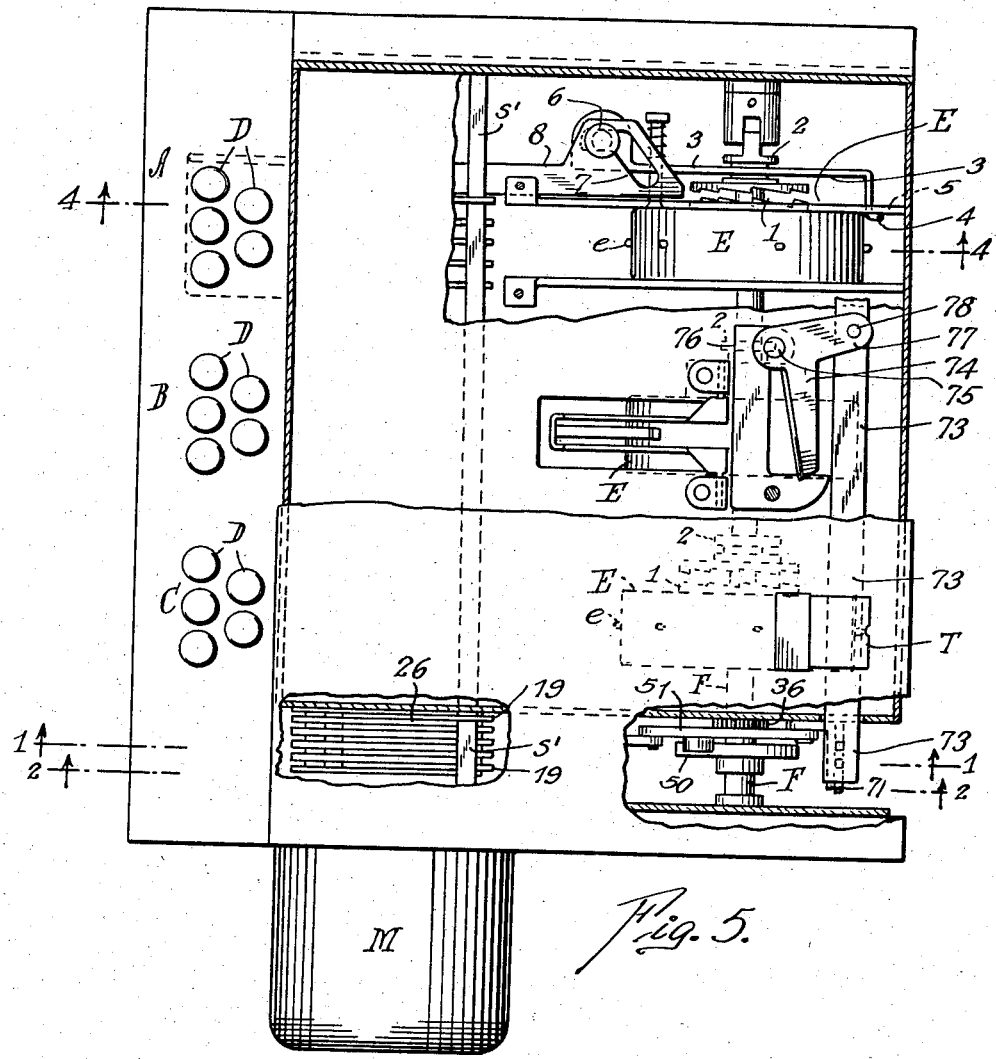

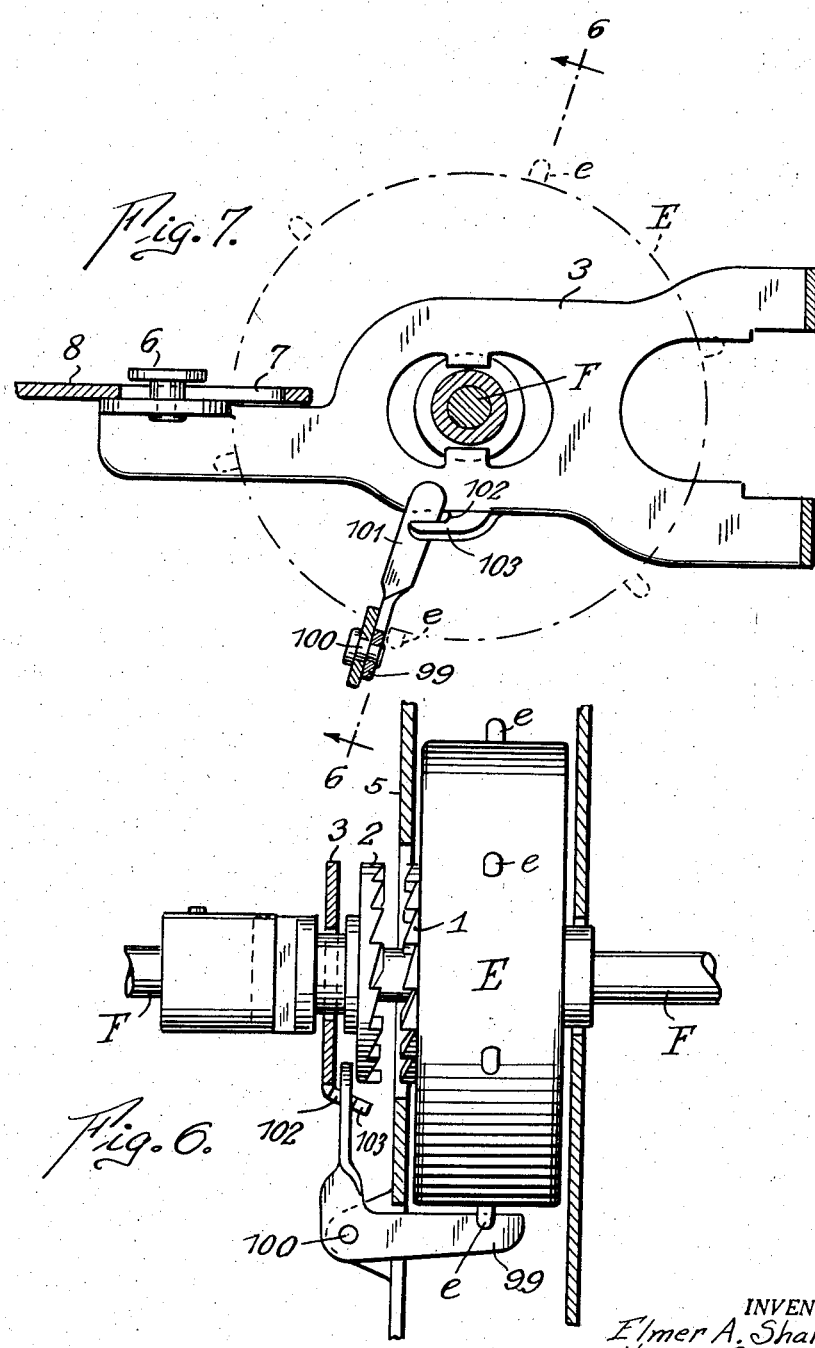

Patented Feb. 7, 1939

2,146,449

UNITED STATES PATENT OFFICE 2,146,449

TICKET ISSUING MACHINE

Elmer A. Shard and Henry G. Weiss,
Cincinnati, Ohio

Application October 18, 1937, Serial No. 169,595

7 Claims. (Cl. 271—2.3)

This invention relates to an improvement in ticket issuing machines, which automatically deliver a selected number of tickets of different denominations under the control of an operator. For purposes of explanation, and without limiting the invention in its application to any particular machine or purpose, it may be assumed that the present invention is applied to a machine for issuing theater tickets. It will appear, from the nature of the invention, that other uses will readily become manifest upon a full understanding of the device.

The machine comprises a plurality of ticket feeding drums with groups of keys corresponding to each feed drum. Each feed drum is adapted to feed tickets of different denominations and the keys in each group selectively govern the number of tickets to be issued by the drum of the corresponding group. The several drums are driven from a common driving member and the different groups of keys provide selecting mechanism whereby tickets of different denominations can be issued in different quantities by the common driving mechanism.

An object of the present invention is to provide means in association with a ticket issuing machine, for checking the sales of tickets to patrons or customers, and to enable effective supervision of the ticket seller's activities in the sale of tickets.

Another object of the invention is to provide simple, durable, and inexpensive means for the accomplishment of the above stated object, such means being applicable to existing ticket issuing machines as well as to new ones.

The foregoing and other objects are attained by the means described herein and disclosed in the accompanying drawings, in which:

Fig. 2 is a similar view on line 2—2 of Fig. 5 showing certain of the parts in the position they assume after a key has been depressed and the main driving gear has partially rotated.

Fig. 3 is a vertical side elevation of the device showing the motor.

Fig. 4 is a vertical section on line 4—4 of Fig. 5 showing one of the feed drums and key actuated mechanism for engaging said drum with its drum shaft.

Fig. 5 is a plan view with parts broken away in successive planes to reveal a different portion of the mechanism in each of the three units shown.

Fig. 6 is a detail view on line 6—6 of Figs. 4 and 7.

Fig. 7 is a detail view of parts shown in Fig. 4.

Fig. 8 is a detail expanded view of one of the selector keys, and associated parts.

Fig. 9 is a fragmental elevational view taken on line 9—9 of Fig. 4.

Fig. 10 is an elevational view of an indicator unit, which forms a part of the present invention.

Figures 1, 1A:
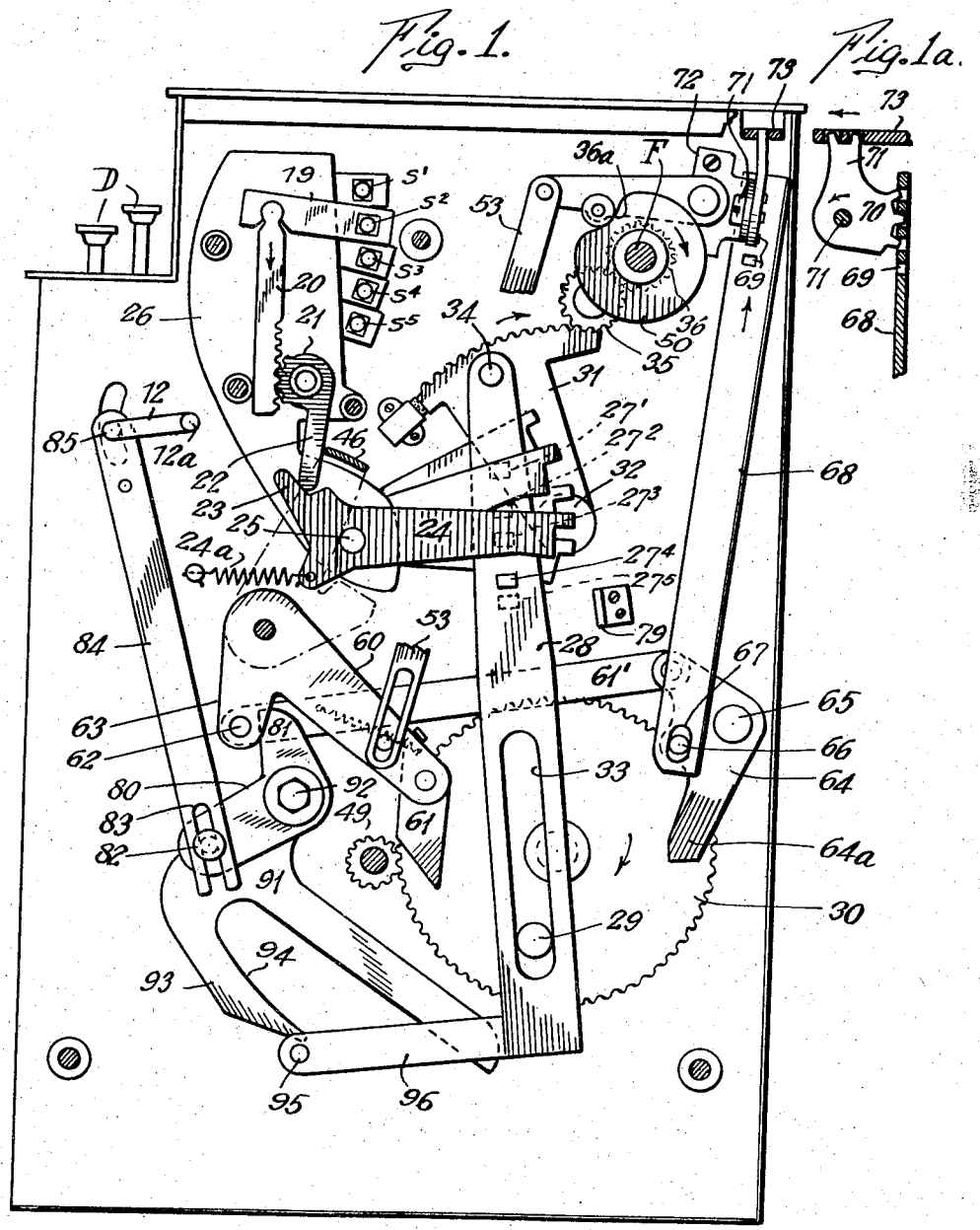
Fig. 1 is a vertical section substantially on line 1—1 of Fig. 5, showing the driving mechanism which is common to the several units. In this view the parts are in the position they assume when the machine is idle.
Fig. 1a is a detail of parts shown in Fig. 1.

Referring first to Figs. 4 and 5 the machine comprises a plurality of units each of which is capable of delivering from one to five tickets, in the embodiment shown, of a determined denomination. For example, the unit A delivers ten-cent tickets, unit B twenty-five cent tickets and the unit C fifty-cent tickets. The keys D determine the number of tickets to be issued by the feed drum E.

The drum E in each of the units is the same and the key mechanism cooperating therewith is also the same and therefore a description of one will suffice for all.

The several drums are loosely mounted on a transversely extending drum shaft F and are each provided with clutch jaws which are adapted to cooperate with similar jaws on a clutch 2 which rotates with the drum shaft F being capable of longitudinal movement thereon. The clutch 2 is moved into and out of engagement with the drum E by a clutch lever 3 pivoted at 4 to a fixed partition wall 5 shown in Figs. 4 and 5. The lever 3 has a stud 6 secured to its free end, which passes through a cam slot 7 formed in a slide 8, which is reciprocated by an arm 9 extending upwardly from a late 10 pivoted on a fixed bar 11. The plate 10 is normally held in the raised position shown in Fig. 4 by a swinging bale 12 located beneath the plate 10. There is a separate plate 10 and corresponding arm for each drum and any one of the keys D of a given group is capable of depressing this plate and therefore engaging the clutch 2 with the corresponding drum. The keys D each have a shank 13 which passes through shelf 16, and the shoulders 15 thereof are adapted to force the plate 10 down when the key is depressed. The abutments 14 of the shank each engage the end of a lever 18 carried by one of the shafts S1, S2, S3, S4, S5. These several shafts determine the number of tickets to be fed by the drum E, it being understood that each of the shafts S1 to S5 inclusive carries a lever 18 which is actuated by a different key D which may be marked with the numerals 1 to 5 inclusive to enable the operator to depress the proper key to deliver the number of tickets required.

The shafts S1 to S5 inclusive can be rocked by any of the keys in groups A, B or C and are therefore capable of controlling the number of tickets issued by any unit. These shafts extend through to the driving section of the machine shown in Fig. 1 and each of said shafts carry in that section an arm 19 which engages a rack 20 arranged to oscillate a sector 21, having a downwardly extending finger 22 which engage a tail 23 of a swinging stop 24 which is pivoted at 25 to fixed frame plates 26.

The outer end of each stop is notched, as at 26', to cooperate respectively with fulcrum pins 27⁵ carried on a link 28 which forms a connecting element between a driving pin 29 secured to a main driving gear 30 and a swinging sector 31 pivoted at 32 to a fixed part of the machine. This connecting element is slotted at 33 for cooperation with the pin 29 and is pivoted on a stud 34 secured in the sector 31.

There are five of the swinging stops 24 and five of the fulcrum pins 27 adapted to cooperate therewith. The several swinging stops and fulcrum pins correspond to the shafts S1 to S5 inclusive.

When the machine is at rest the fulcrum pins 27 are so positioned relatively to the swinging stops 24 that the link 28 can move past the swinging stops without any of the fulcrum pins 27 engaging the notches 26 of the swinging stops. When a key is depressed, however, the relation of the parts will be changed. As shown in Fig. 2, the number 4 key has been depressed, bringing one of the swinging stops 24 into position to be engaged by a fulcrum pin 27⁴ carried on the connecting element 28. In this figure the pin 29 has rotated clockwise about three-fourths of a revolution from the position shown in Fig. 1. This movement will swing the link 28 on its pivot 34 to the position shown in Fig. 2, in which the fulcrum pin 27⁴ is in position to engage the notched end 26' of the swinging stop 24. It is to be noted that the depression of the key caused the finger 22 to swing counter-clockwise and permit the spring 24a to pull the stop 24 to the position shown in Fig. 2. The sector 31 meshes with an idler 35 which engages a gear 36 secured to the drum shaft F. As the main drive gear rotates, its pin 29 will drive the sector 31 through different angular distances depending upon which one of the swinging stops 24 is selected, it being understood that the varying distances between the selected pivotal point of the link 28 and the center of the fulcrum pins 27, will vary the amount of motion transmitted by said link 28 to the sector 31. That is to say, the higher the fulcrum occurs on the link 28, the less will be the swing of pivot 34 at the top of said link. In the drawing the foremost stop shown is the one corresponding to the number 4 key and therefore the stroke of the sector 31, with the parts in the position of Fig. 2, will be sufficient to rotate the drum E through an angular distance sufficient to issue four tickets. Had the number 1 key been selected for example, the stop 24 would have been positioned to cooperate with the lug marked 27' and a correspondingly smaller motion would be transmitted by the link 28 to the sector 31, in this instance just sufficient to rotate the drum through one sixth of a revolution to issue one ticket. In a similar way any one of the keys from 1 to 5 inclusive is capable of swinging its corresponding stop 24 into position for engagement with the several stops 27', 27², 27³, 27⁴, 27⁵.

Means are provided for controlling the circuit of the motor M which transmits motion to the feed drums through the main drive gear 30, sector 31 and associated apparatus above described. These means include a switch having two sets of contacts, the first set comprising jaws 37 and 38, and the second set comprising jaws 39 and 40. Conductors, not shown, are connected with the switch jaws, and when the circuit is closed across either set of contacts, the motor will be started. A swinging contact 41 carried by a block 42, pivoted at 43, is adapted to close the circuit across the contacts 37 and 38 to initially start the motor. The block 42 is turned on its center by a pin 44, (Figs. 2 and 3) secured thereto and also connected with a lever 45, having a downwardly projecting lip 46 adapted to be actuated by any one of the five key actuated fingers 22 above described, so that whenever a key is depressed the lever 45 will be swung clockwise to close the circuit across the contacts 37 and 38 and thereby start the motor. After the motor starts it will rotate the main drive gear 30 through the gears 47, 48 and 49, indicated in Fig. 3. The main drive gear 30 thus rotated will swing the link 28 over to the position shown in Fig. 2 and further movement of this gear will cause said link to fulcrum on the pin 27⁴ and transmit motion to the drum shaft F through sector 31 and gears 35 and 36. This will cause a cam 50 carried on shaft F to lift a lever 51, pivoted at 52, and cause said lever to raise a link 53 secured to the free end thereof. This latter movement performs a number of important setting functions, one of which is to lift a link 54 connected to the link 53 by a pin 55 passing through a slot 56 in a side plate of the machine. The lower end of the link 54 is connected with a second swinging contact arm 57 pivoted at 58 and carrying a switch blade 59 arranged for coaction with the switch jaws 39 and 40. When the cam 36 rotates it closes the circuit across said second set of switch jaws 39 and 40 and holds the motor circuit closed until after the drum has issued its ticket or tickets, it being understood that after the drum has issued the tickets, the cam 36 returns to the position shown in Fig. 1 in which the notch 36a comes under the roller carried by the lever 51. The link 53 also swings a kick-off lever 60 upward to the dotted position shown in Fig. 2. This kick-off lever has pivotally mounted on one end a spring-retracted dog 61 adapted to be engaged by the eccentric pin 29 carried on the main drive gear 30.

When the kick-off lever 60 is in the dotted position shown in Fig. 2, the dog 61 will be in the path of the eccentric pin 29, and as the latter strikes it, it will swing said kick-off lever 60 counter-clockwise and cause it to move a connecting link 61' which is connected at 62 to an arm 63 on said kick-off lever. This movement is imparted to a bell crank 64, pivoted at 65, to a fixed plate on the machine. The bell crank 64 carries a pin 66, which engages a slot 67 in a bar 68, having rack teeth 69 formed on the upper end thereof for engagement with a sector 70, pivoted at 71, to a fixed bracket 72. The sector 70 carries an arm 71, having teeth which are adapted to reciprocate a bar 73. This bar extends transversely across the top of the machine and actuates the knife 74, shown in Fig. 5, used to shear the issued tickets. The knife 74 is pivoted at 75 to a bracket 76 and has an arm 77 engaging a pin 78, which pin is carried by the bar 73. As thus arranged it is clear that when the crank pin 29 strikes the kick-off lever 60, the bar 73 will be reciprocated through the connections above described and a cutting movement will be transmitted to the knife 74. While only one knife is shown in the drawings, it is to be understood there is a knife corresponding to each of the units A, B and C, and the several knives are all actuated by the one reciprocating bar 73.

When the kick-off lever 60 is actuated, as above described, it also swings the end 64a of the bell crank 64 into the path of the crank pin 29, and when the crank pin strikes this portion of the bell crank it rocks it counter-clockwise and opens the knife to the position shown in Fig. 6, and also restores said kick-off lever to the full line position shown in Figs. 1 and 2. This completes one cycle of operations as far as the kick-off lever and knife are concerned, but while this takes place several other functions are being performed by the kick-off lever and other parts of the mechanism.

It is to be noted that when the crank pin 29 is swinging the link 28 about its selected fulcrum in a direction to drive the sector 31 clockwise, that the clutches on the shaft F are in engagement with the drums E and therefore the ticket strip T fed out into position to subsequently be acted on by the knife. When the crank pin 29 swings the link 28 in the opposite direction to oscillate the sector 31 counter-clockwise, the clutches are disengaged by mechanism to be presently described.

During clockwise or feeding movements of the sector 31 the link 28 is fulcrumed on a selected one of the swinging stops 24 cooperating with one of the several fulcrum pins 27, but during the opposite movement of the sector the link always fulcrums about the fixed bracket 79 which is positioned to cooperate with the lower fulcrum pin 27⁵.

For disengaging the clutches 2 from the drums during the backward movement of the sector 31, there is provided a bell-crank 80, the arm 81 of which is engaged by the stud 62 of the kick-off lever 60. The upward movement of the kick-off lever is effected after the drum has fed out the selected number of tickets and at this time the lever 80 is rocked clockwise, causing its stud 82 to engage the end of a slot 83 in a bar 84, the upper end of which is connected at 85 to the bale 12 pivoted at 12a. This bale, as described in the earlier part of the specification, underlies the plate 10 and it will be recalled that when a key is depressed this plate is swung down about the shaft 11 and into contact with the bale 12, causing the movement of slide 8 and engagement of the clutch 2 with its corresponding drum E. Now when the kick-off lever rocks the stud 82 upward, the bale 12 will be lifted to the dotted position shown in Fig. 4, thereby disengaging the clutches and thus permitting the sector 31 to rotate the shaft F counterclockwise without effecting any movement of the drums E. Means are provided for positively stopping the feed drums at a determined position to insure that the ticket strip T will be severed at the correct location by the knife. These means include a movable stop 86 (Fig. 4) pivoted at 87 and having a downwardly extending arm 88. This arm is connected by a link 89 to an arm 90 of a swinging member 91 pivoted on the stud 92 which also serves as a pivot for the bell crank 80. The member 91 has a curved arm 93 the inner cam surface 94 of which is shaped to coact with a pin 95 (Fig. 2) carried by an extension 96 of the connecting element on link 28. The member 91 is so located and the surface 94 is so plotted or shaped that the pin 95 will strike and rock said member after the lapse of determined time intervals from the time that the drum starts to move in feeding the ticket strip. For example if the number one key is depressed to issue one ticket the pin 95 will strike the surface 94 at a point near the free end of the arm 93 and the stop 86 will swing in and engage one of the feed pins e of the drum E after one ticket has been issued. When another key is depressed, say the one calling for five tickets, the link 28 will rock on a different fulcrum and the pin 95 will have to travel a greater distance before it engages the surface 94 and in this instance it will strike said surface at a point much nearer the center of oscillation 92 of the member 91. This gives the drum time enough to feed out a strip corresponding to the length of five tickets, after which the stop 86 is swung in to engage one of the feed pins e of the drum. In a similar manner the stop 86 will move in at the proper time to positively stop the drum after the issuance of any selected number of tickets.

A spring pressed pawl 97 pivoted at 98 is also provided to prevent backward or counter-clockwise rotation of the drum, this pawl also coacting with the feed pins e carried by the feed drum.

To prevent the drum from being turned forward or clockwise when the clutches are out of engagement with the drums, we provide a latch 99 (Figs. 4, 6 and 7) pivoted to a fixed bracket at 100 and having an arm 101 the end of which engages a slot 102 formed in an ear 103 on the clutch lever 3. When the clutch is out of engagement with the drum the latch 99 is in front of a feed pin e and therefore positively prevents the forward rotation of the drum. The drum is therefore locked against rotation in either direction at this time by the latch 99 and the pawl 97. When a key is depressed the clutch lever 3 will rock the latch 99 out of the path of the pins e and permit the drum to turn through the angular distance corresponding to the key operated, as will be understood.

At this point in the description, it is considered desirable and helpful to explain the operation of the machine proper, as described in the foregoing detailed specifications.

The ticket strip T is initially threaded around the drum E, the pins e of which engage suitable feed holes t formed in the strip. The strip T may be fed either from a continuous role or from a continuous stack folded zig-zag fashion and held in a suitable receptacle.

To issue a ticket the operator depresses a button in the group corresponding to the denomination required, the particular key selected in the desired denomination corresponding to the number of such tickets wanted. Pressing the key causes one of the fingers 22 (Figs. 1 and 2) to rock the lever 45 which in turn moves the switch blade 41 and closes the motor circuit through contacts 37 and 38. This causes the main drive gear 30 and crank pin 29 to move and carry link 28 to position of Fig. 2, where one of the fulcrum pins 27 engages the notched end of the selected stop 24 released by the key. The crank pin 29 will now rock the link about the fulcrum 27 and rock the sector 31 clockwise and cause the drum shaft F to rotate. Depression of the key also causes the latch 99 to be released from the drum and the clutch to engage the drum. The rocking of the shaft F causes the cam 50 to lift the link 53, close the motor circuit through contacts 39 and 40, and lift the kick-off lever 60 into the dotted position of Fig. 2. The crank pin 29 then comes around into engagement with the kick-off lever 60 after the sector has had time to make its maximum stroke to issue the greatest number of tickets. The link 61 then moves to the right lifting the bar 68 and through sector 70, and bar 73 operates the knife to sever the issued ticket or tickets from the strip T. The kick-off lever strikes the pin 44 and rocks the lever 45 and restores the fingers 22, stops 24 and keys to normal position. This lever 60 also rocks the bell crank 80 and through link 84 and bale 12 restores the plate 10 to its upper position and disengages the clutches from the drums. During this time the member 91 has also been rocked to cause the movable stop 86 to positively stop the drum in set position after the desired number of tickets have been issued. The link 28 is now rocked about the fulcrum pin $27^5$ which at this time engages the stop 79 to rock the sector 31 back to its normal position shown in Fig. 1. The cam 36 is then turned back so the notch 36a comes opposite the roller on lever 51. The crank pin 29 now strikes the arm 64a and through link 61' restores the kick-off lever to the full line positions of Figs. 1 and 2. This completes the cycle of operations and cuts off the current from the motor, the down stroke of the kick-off lever pulling down links 53 and 54 and breaking the circuit across the contacts 39 and 40. This leaves the parts in the positions shown in Figs. 1, 3 and 4 ready to again go through the above cycle of operations upon the depression of one of the keys.

Of primary importance to the present invention, is the means now to be described, constituting a novel and effective indicating apparatus, and mechanism operating in conjunction with the main portion of the machine above described, for recording and checking the sales of tickets. The recording of the ticket sales is effected through a time-delay mechanism that maintains the record for a limited period of time, thereby enabling thorough and accurate supervision of the ticket-seller's activities and disclosing any attempt at re-selling tickets taken in or collected at the doorman's station.

The arrangement of elements is such that actuation of the keys, as hereinbefore explained, to deliver one or more tickets of a selected denomination, is accompanied by the energization or illumination of corresponding figures or indicia upon a suitable sign or register panel such as is disclosed in Fig. 10 of the drawings. As is most often the case, only two banks or groups of keys of the machine are used, for example, group A and group C, the former being employed to issue from one to five adults' tickets, and the latter to issue from one to five children's tickets. When so used, the machine is accompanied by a sign or panel divided into ten separate compartments, (see Fig. 10), of two rows of five compartments each. One row of compartments is headed "Adults", and the compartments of such row are numbered consecutively from 1 to 5. The other row is headed "Children", and its compartments are similarly consecutively numbered. Within each of the ten compartments is a signal means, preferably in the form of a lamp 110 for illuminating the compartment number upon depression of a proper selector key D. Thus, if the third key of the adult's group A be momentarily depressed, three adults' tickets will be issued and the third compartment in the "adults" row of the sign or panel will be illuminated. The compartment will remain illuminated for a certain time period (one minute, more or less), unless before expiration of such time period some other key is depressed; for example, should the operator thereafter depress the second key of group C before expiration of the time period previously initiated, two children's tickets will issue and illumination of the second compartment in the "children" row of the sign or panel will displace the previous signal, which was "3 adults". If no other keys are subsequently depressed, the "2 children" indication on the sign or panel will be maintained until a time-delay device extinguishes the signal as above stated, requiring a minute, more or less.

The ten electrical lamps of the sign or register panel are indicated in the wiring diagram which is included in Fig. 4. In practice, the sign or register panel is of box formation with its interior divided into separate compartments, which house the individual lamps. The compartments are covered by a plate 112 having translucent portions 113 registering with the compartments and bearing the rows of numbers as shown. The lamps are wired as shown in Fig. 4. It should be understood that the sign or panel may be located at any suitable station where it may be observed by a supervisor, and by the ticket purchaser if desired.

For an understanding of the mechanism employed to accomplish the above stated functions, the reader is referred to Figs. 3, 4, 8 and 9 of the drawings.

From said drawing figures, it will be evident that the shank of the selector key has an extension 114 provided with a laterally extending cam following stud 115 located directly above the free end 116 of the shank. The stud 115 is so located that a descending movement of the key shank will bring the stud into contact with the leading face 117 of a triangular cam 118, and continued downward movement of the key and stud will operate to rotate the switch control element 119, of which the cam is an integral part. It will be noted that the triangular cam has two substantially straight line cam faces 117 and 120 converging to form an included upper apex. Upon reaching its lower limit of descent, stud 115 leaves the cam face 117, permitting the switch control element 119 to move towards the right under the influence of spring 121, the opposite ends of which are secured to the switch control element and to a stationary part of the machine, such as the insulating block 122. Simultaneously with the spring urged movement of the element 119, the lower end 116 of the key shank depresses the insulated forward end 123 of a movable electrical switch contact spring 124, thereby to place the end 123 beneath a notch or dog 125 of the control element 119. The electrical contact elements of contact springs 124 and 126 are thereby maintained in closed circuit relationship, causing the energization of a lamp 110 of the sign or register panel, the circuit comprising the source of electricity 127, conductor 128, switch contacts 126 and 124, conductor 129, lamp 110, conductor 130, time-delay switch 131, and conductor 132.

Upon closing of the circuit as above explained, the switch control element 119 will have moved under the influence of a tension spring 121 to the extent of placing the return face 120 of cam 118, to a position at which the cam follower stud 115 will return at its normal elevated position by traveling along said cam face 120, rather than along the leading cam face 117 upon which it descended. Thus, depression of the selector key D operates not only to initiate the ticket issuing action, but also to close the circuit of one of the lamps in a compartment of the sign corresponding to a designated selector key. It will be noted that return of the selector key to the normal inoperative position, in which it is in readiness for a subsequent actuation, does not break the electrical circuit through the switch 124—126. This switch is held in closed condition by the notch or dog 125 of the switch control element 119, until some other selector key is depressed. Until some other selector key is depressed, the notch or dog will hold the switch 124—126 closed, irrespective of successive actuations of the same key that initially closed said switch. The circuit closed by said switch will remain operative for maintaining a lamp 110 energized, until expiration of a predetermined time-delay period of one minute, more or less, as determined by the time-delay switch 131.

Means are provided for breaking the contacts of switch 124—126 when some other one of the selector keys is depressed for the purpose of issuing denominations or numbers of tickets other than were issued by depression of the particular key to which the above explanation referred. Said means comprise a secondary switch control element 133 which has a transverse stop lug 134 that is contacted by the control element 119, for imparting the cam movement of element 119 to the element 133. A lost motion connection, which may be in the form of a pin and slot arrangement 135 and 136 on the members 119 and 133, respectively, provides a certain correspondence of movements between said elements, as will be hereinafter described. Except by the action of the stop lug 134 and the lost motion connection just mentioned, there is no correspondence of movements between the switch control elements, due to the fact that element 119 has its hub 137 loosely mounted upon the supporting shaft 138, whereas the hub 139 is pinned, keyed, or otherwise fixed upon the shaft, as at 140.

At this point in the description, it should be understood that each and every selector key is provided with primary and secondary switch control elements, and a switch such as 124—126 for closing an individual electrical circuit through its corresponding lamp in the sign or register panel of Fig. 10. Thus, in a machine having ten selector keys, there will be ten individual key controlled switches, lamps, and individual circuits, said circuits, however, having a common return conductor 130 in which the time-delay switch 131 is electrically interposed. By referring to the wiring diagram of Fig. 4, it will be noted that a single time-delay switch is employed for determining the period of illumination of any selected one of the sign lamps.

As before stated, each selector key is provided with a switch and a switch control unit as shown in the lower half of Fig. 9. The individual switch control units of the foremost bank of selector keys are mounted upon the cam shaft 138, whereas the units operated by the rearmost bank of selected keys are mounted upon a second cam shaft 141, which is directly behind the shaft 138. The shafts are journaled in suitable bearing brackets 142 which are supported upon a partition 143 of the machine casing. All of those switch control elements which correspond to element 133, and which cooperate with the foremost bank of keys, are fixedly mounted upon the cam shaft 138. In like manner, the elements such as 133 which cooperate with the rearmost bank of keys, are fixed upon the other cam shaft 141. All of the elements such as 133, however, move always in unison, due to the provision of the link and connecting rod arrangement indicated at 144. A spring 145 constantly urges all the elements 133 towards the normal position indicated in Fig. 4. Thus, when any one of the elements 119, of Fig. 4 for example, is cammed to the left by the action of the selector key stud 115, all of the switch control elements 133 in the entire machine, are likewise moved to the left by reason of the stop lugs 134 being in the path of movement of the control member 119. Upon completion of the downward stroke of the selector key, however, the spring 121 pulls the control element 119 into position for maintaining closed the contacts of the switch 124—126, said movement of element 119 being transmitted to its cooperative element 133 through the medium of the spring 145. Upon actuation of a different selector key, of course, a different switch such as 124—126 will be closed, and all switch control elements corresponding to 133 will again be moved to the left, or counterclockwise, whereupon that element 133 shown in Fig. 4 will, by reason of the pin and slot lost motion connection, sufficiently withdraw the switch control element 119 to release the switch extension 123 from the holding action of the notch or dog 125. This will break the electrical circuit of switch 124—126 and its corresponding lamp, while at the same time another circuit of another lamp, corresponding to a key depressed, will be closed to energize the proper corresponding lamp of the sign or register panel. As will be understood, the ticket issuing mechanism will be actuated simultaneously with each circuit closing operation of a switch associated with a switch control unit. Referring to Fig. 4, it is pointed out that each conductor disclosed at the extreme right of the figure is to be connected to a movable switch contact such as 124. The stationary contact of each switch will, of course, be connected to the common return conductor 128.

Each selector key may be provided with a tension spring 146 for returning it to the normal elevated position shown in Fig. 4.

The manner in which the time-delay switch 131 functions to maintain a given signal for a predetermined period of time, has been explained, and its position in the common return wire of the electrical circuit arrangement is clearly disclosed at the right of Fig. 4. The time-delay switch comprises a clock mechanism having a spring winding shaft 147 and the usual gearing 148 provided with a comparatively rapid escapement 149. The clock mechanism is wound by means of a lever 150 which is fixed to the shaft 147, and which is rotated in clockwise direction by means of a stud 151 acting upon the lever when the beam or arm 152 is rotated about its pivot 153 by the action of a stud 154 on the free end 155 when the motor switch actuating link 54 is shifted upwardly, as previously explained. The movement thereby imparted to the lever 150, in the direction of the arrow, forces the small spring-urged bellcrank 156 forwardly and onto the track portion 157 of the lever head, thereby to rotate the switch arm 158 about its pivot 159, the insulated finger 160 thereof impinging upon the movable contact 161 and closing it against the stationary contact 162. In this manner, the operation of the clock mechanism is initiated upon each ticket issuing operation of the machine, and the contacts 161—162 will be kept closed until the lever 150 returns to the normal position of Fig. 3 to which a leg of the bell-crank assumes a position within the notch at the end of the cam track 157. It will be understood that the lever 150, after having been rotated in clockwise direction by the action of the stud 151 and lever 152, will gradually return to the Fig. 3 position, this requiring a time interval of one minute, more or less. Thus, the time-delay switch contacts, which are connected in the common return conductor of all the lamp circuits, will not cut off the current energizing any register panel lamp until expiration of such time interval. The broken circuit of the common return wire, however, is restored to closed circuit condition upon actuation of any one or more selector keys.

By reason of the electrical arrangement just described, the depression of a selector key will effect the issuance of tickets of a denomination and number controlled by that key, and at the same time, the contacts of the time-delay switch will be closed, to provide a closed circuit condition of the common return wire 130—132. At substantially the same instant, the key that had been depressed will close the lamp circuit of its associated switch control unit, thereby indicating upon the sign or register panel the number and denomination of tickets dispensed by the key that was actuated. If no other key be depressed thereafter, the sign or register panel will display the ticket information for a predetermined period of time as determined by the time-delay mechanism just described. If, on the other hand, a second key be depressed, immediately after depression of the first key, the electrical circuit of the switch control unit associated with the first key, will be broken before expiration of the predetermined time period, and the first signal will be immediately displaced by the new signal initiated upon depression of the second key. Thus, by depressing different keys in rapid succession, the signals of the register panel will change with equal rapidity. It will be appreciated, therefore, that the provision of the electrical sign or register panel apparatus, imposes no limitations upon the ticket issuing mechanism, and especially does it not affect the rapidity with which tickets might be issued were the machine not equipped with the electrical ticket checking apparatus.

It is to be understood that various modifications and changes may be made in the structural details of the device, within the scope of the appended claims, without departing from the spirit of the invention.

What is claimed is:

1. The combination with a ticket issuing machine comprising a group of keys and means associated therewith for delivering different quantities of tickets upon manipulation of different keys, of means including a register for visibly indicating temporarily the number of tickets issued upon manipulation of selected keys in succession, and time-delay apparatus connected with the register means, including means to modify the visibility period of information displayed by the register means subsequently to the manipulation of a key.

2. The combination with a ticket issuing machine comprising a series of keys and means under the control of the keys for issuing different quantities of tickets having different denominations, upon manipulation of selected keys, of a register panel having divisions corresponding in number to the number of keys, said divisions being numbered and identified to indicate the quantities and denominations of tickets issued by the manipulation of keys identified with individual divisions of the register panel, and means for electrically illuminating register panel divisions corresponding to selectively manipulated keys, said means including a time-delay mechanism for maintaining the electrical illumination of any given register panel division for a predetermined time interval following the manipulation of a corresponding key.

3. A ticket issuing machine including in combination a plurality of ticket feed drums, a common shaft associated operatively with each of said drums, clutches movable with said shaft, means for engaging said clutches with said drums, means for operating said clutch engaging means, and a plurality of groups of keys corresponding to each drum so arranged that any key in any group can operate the clutch engaging means of the corresponding drum in its respective group, means controlled by said keys for determining the extent of movement of said drum to vary the number of tickets to be issued, a register panel having divisions corresponding in number to the total number of keys, each panel being identified with a key, an electrical lamp associated with each panel division, a series of electrical switches, one for each key and closable upon actuation of the keys, a series of electrical circuits each including a switch and a lamp corresponding to a key of the machine, and a source of electricity including a conductor common to said series of electrical circuits for energizing the lamps when keys are depressed to close their respective electrical circuits, and a time-delay switch electrically connected with the common conductor for limiting the period of energization of any lamp included in said series of electrical circuits.

4. A ticket issuing machine including in combination a plurality of ticket feed drums, a common shaft associated operatively with each of said drums, clutches movable with said shaft, means for engaging said clutches with said drums, means for operating said clutch engaging means, and a plurality of groups of keys corresponding to each drum so arranged that any key in any group can operate the clutch engaging means of the corresponding drum in its respective group, means controlled by said keys for determining the extent of movement of said drum to vary the number of tickets to be issued, a register panel having divisions corresponding in number to the total number of keys, each panel being identified with a key, an electrical lamp associated with each panel division, a series of electrical switches, one for each key and closable upon actuation of the keys, a series of electrical circuits each including a switch and a lamp corresponding to a key of the machine, and a source of electricity for energizing the lamps when keys are depressed to close their respective electrical circuits, and a time-delay controlled electrical switch common to all the electrical circuits of the keys and lamps, and operating upon depression of any key to maintain the energized condition of a corresponding lamp for a time interval in excess of the time required for depressing such key.

5. In a ticket issuing machine, the combination of ticket issuing mechanism including a key, an electrical motor and a switch therefor closed by the actuation of the key to operate said mechanism, an electrical circuit including the motor, a source of electricity, and said switch, a second electrical circuit, a signal device and an electrical switch in said second circuit for controlling electrical energization of the signal device, means to close the electrical circuit of the second switch and the signal device upon actuation of the key, and a time-delayed switch connected in the circuit of the signal device, for maintaining the signal device operative for a short time period in excess of that required for issuance of the ticket.

6. In combination with the manipulating keys of a ticket issuing machine, a series of normally open-circuited electrical contact switches, one for each key, means for closing the contacts of the individual switches upon actuation of individual keys, means for maintaining the closed contact condition of any one key controlled switch until another switch is closed by subsequently actuating a different key, a series of electrical circuits each including a signal device, a source of electricity, and one of said switches, said signal devices being individually identified with the keys, and a time-delay switch connected with all the circuits to limit the period of closed circuit condition of any circuit closed at a key controlled switch.

7. A ticket issuing machine comprising in combination, a bank of keys to be individually manipulated by an operator, a series of ticket feed drums, and mechanism for initiating and completing rotation of one of the drums to deliver tickets upon the manipulation of a key, an electrical circuit including a source of electricity and a switch to be closed for completing the electrical circuit, means associated with a key for closing said switch and keeping it closed, a second normally open-circuited switch in said circuit including a timer, a lever for closing the second switch and initiating operation of said timer, said lever being associated with the mechanism for initiating and completing rotation of the feed drums, thereby to be moved to timer-starting position upon each ticket-issuing action, and means operative, upon expiration of the time period of the timer, to restore the second switch to the normal open-circuited position.

ELMER A. SHARD.
HENRY G. WEISS.